(12) United States Patent
Jang et al.

(10) Patent No.: US 7,294,182 B2
(45) Date of Patent: Nov. 13, 2007

(54) COMPOSITION FOR WATER-REMOVABLE INK

(75) Inventors: Dong Kyun Jang, Daejeon (KR); Dong Joo Kwon, Seoul (KR)

(73) Assignee: Artech Plus Co., Ltd., Ansan-si (KR)

( * ) Notice: Subject to any disclaimer, the term of this patent is extended or adjusted under 35 U.S.C. 154(b) by 247 days.

(21) Appl. No.: 11/182,202

(22) Filed: Jul. 15, 2005

(65) Prior Publication Data

US 2007/0012218 A1   Jan. 18, 2007

(51) Int. Cl.
*C09D 11/00* (2006.01)
(52) U.S. Cl. .................. 106/31.32; 106/31.19
(58) Field of Classification Search ............. 106/31.32, 106/31.19
See application file for complete search history.

(56) References Cited

U.S. PATENT DOCUMENTS 5,981,115 A * 11/1999 Furuya et al. ................ 430/19
6,063,173 A * 5/2000 Torii et al. ................ 106/31.17
6,172,001 B1 * 1/2001 Hotta et al. ................ 503/201

* cited by examiner

*Primary Examiner*—J. A. Lorengo
*Assistant Examiner*—Veronica Faison-Gee
(74) *Attorney, Agent, or Firm*—Porter, Wright, Morris & Arthur, LLP

(57) ABSTRACT

The present invention provides a composition for water-removable ink with an effect of coupling retardation by using an aliphatic alcohol as a solvent, which is selected from a group comprising n-butyl alcohol, n-propyl alcohol, isopropyl alcohol and pentanol, so that the curiosity of infants or juveniles can be stimulated to enhance the learning effect and also various desires of students or adults can be satisfied in terms of ornamental purposes.

2 Claims, No Drawings

COMPOSITION FOR WATER-REMOVABLE INK

FIELD OF THE INVENTION

The present invention relates to a composition for water-removable ink. More specifically, the present invention relates to a composition for water-removable ink, which is not only erased clearly and rapidly without leaving a trace or residuum but also shows an effect of coupling retardation to stimulate infants or juveniles to have a desire for learning and become curious.

BACKGROUND OF THE INVENTION

Conventional water-removable ink was the one using supersaturated ink filtered in the manufacture of ink. Therefore, the supply of ink on a writing material such as paper or white board from a writing tool such as pen was not always controlled constant. At an early stage of using a writing pen, an excessive supply of ink produced unintended contamination around written notes, and after the lapse of some time, a nozzle of the pen might be blocked, which deteriorated the freshness of the ink color. Also, after the written notes have been erased, yellow trace was left.

In this regard, Japanese Patent Publication No. 1997-59547 by Kawashima Kiyoharu disclosed "colored ink and writing system using the same", which comprises a developer including more than one electron accepting compound selected from adipic acid, ascorbic acid, zinc chloride, calcium chloride, etc.; a coupler including more than one electron donating compound selected from 3-diethylamino-7-chlorofluoran, rhodamine B lactam, etc.; a coupling maintaining agent such as polyvinyl alcohol, arginic acid, and cellulose; and a surfactant. This patent publication provided a new ink composition, which could be erased by water only and be compared to a conventional technology wherein written notes had been erased using solvents. The ink composition in this patent publication used leuco dyes and the developer, and it was convenient and simple material to erase.

However, although the written notes using the above ink composition could be erased by water, since the hydrophilic property of ink itself was low, it was difficult to erase the written notes clearly by using small amount of water. Also, in erasing the written notes, the ink was drifted, and after erasing, residuum of the ink left, which caused yellowing phenomenon on the writing material such as white board or paper. Further, as the fluidity of the ink was deteriorated, it was difficult to expect uniform distribution of color. Furthermore, compared to conventional oily and aqueous pens, chromaticness of the color of the ink deteriorated.

Meanwhile, conventional writing pens using colored ink mostly had advantages in that an inherent color of the ink was released immediately upon writing.

However, if such revelation of color of the ink is delayed for the time being, it will not only be able to stimulate the curiosity of infants or juveniles, thus enhancing learning effect, but also to satisfy various desires of students or adults in terms of ornamental purposes. Up to now, however, writing tools using such ink with an effect of coupling retardation have not yet been developed.

In this regard, the applicant of the present invention disclosed "water-removable hydrated writing material" in Korean Patent Publication No. 2002-6818, which comprises an electron-donating coloring agent including 3,3-bis (4-dimethylaminophenyl)-6-dimethylaminophthalide, etc.; an electron-accepting developer including citric acid, gallic acid, succinic acid, etc., with the coloring agent and the developer being dissolved in an organic solvent; a binder; a surfactant; and an anti-oxidizing agent. According to the patent publication, the writing material showed a rapid fading-away effect of color by water, which changes little after a lapse of some time. Also, it was not harmful to the human body, but was environment-friendly.

However, in practice, the rapid fading-away effect of the above writing material fell short of our expectation. Further, it has never been expected and intended that the above writing material would show an effect of coupling retardation.

SUMMARY OF THE INVENTION

The object of the present invention is therefore to overcome the disadvantages encountered in the prior art by providing a new composition for water-removable ink, to meet consumers' needs which have been expected in the pertinent field.

Specifically, in order to overcome the disadvantages of the conventional ink composition that the uniform distribution of color could not be achieved due to the deterioration of the fluidity of ink and the freshness of the color deteriorated, the present invention has an object to provide a composition for water-removable ink having remarkably improved coupling effect and image stability, by using a specific lubricant and a certain dispersing and level-dyeing agent.

Another object of the present invention is to provide a composition for water-removable ink with an effect of coupling retardation by using an aliphatic alcohol as a solvent, so that the curiosity of infants or juveniles can be stimulated to enhance the learning effect and also various desires of students or adults can be satisfied in terms of ornamental purposes.

In order to achieve the above objects, the composition for water-removable ink according to the present invention comprises:

3-5% by weight of more than one electron-donating coloring agent selected from a group comprising 2-anilino-6-dibutylamino-3-methylfluoran, 2-dibenzylamino-6-diethylamino fluoran and 9-(diethylamino)spiro[12H-benzo[a]xanthene-1,2-isobenzofuran]-3;

6-8% by weight of gallic acid (3,4,5-oxybenzoic acid) as an electron-accepting developer;

40-45% by weight of methylethylketone as a hydrophilic solvent;

0.5-1.0% by weight of triglyceride as a lubricant;

2-4% by weight of polyoxyethylene lauryl ether as a surfactant;

0.5-1.0% by weight of a mixture of oleic acid, polyethylene glycol, stearic acid, polyoxyalkylene tristyrenated phenol and a block copolymer of polyoxyethylene-polyoxypropylene as a dispersing and level-dyeing agent;

5-7% by weight of 5% hydroxypropyl cellulose solution as a fixing agent; and the balance of more than one solvent selected from a group comprising n-butyl alcohol, n-propyl alcohol, isopropyl alcohol and pentanol.

As a coloring agent, the present invention uses leuco dyes, which have been used for conventional water-removable ink.

The leuco dye is usually colorless, but has a lactone ring which develops color by the action of acid, so that it develops color or fades away according to the opening and shutting of the lactone ring. That is, if the lactone ring is open by an aqueous acid after writing, the color develops, but if the aqueous acid does not act any more by being dissolved in water, the lactone ring is shut. Due to this property, the leuco dye has been used as a main material for water-removable ink.

The inventor of the present invention found that the above objects of the invention could be achieved when using dyes other than the leuco dyes disclosed in Japanese Patent Publication No. 1997-59547 and Korean Patent Publication No. 2002-6818, i.e., 2-anilino-6-dibutylamino-3-methylfluoran, 2-dibenzylamino-6-diethylaminofluoran and 9-(diethylamino)spiro[12H-benzo[a]xanthene-1,2-isobenzofuran]-3. Thus, the inventor used such dyes as a main component of the composition of the present invention.

For development of such leuco dyes, the present invention uses gallic acid as the electron-accepting developer. The developer is water-soluble, which simultaneously dissolves in water and in a solvent as well. It is solid at room temperatures, but becomes acidic as it dissolves in water.

Further, in order to improve the fluidity of ink, the present invention uses the lubricant in the amount of 0.5 to 1.0% by weight, preferably triglyceride, as an essential component of the ink composition. That is, the present invention uses the lubricant to improve the problem of the conventional water-removable ink using supersaturated ink filtered in the manufacture of ink, in which as time went by, the nozzle of the pen was blocked and the color could not be uniformly distributed.

Furthermore, the present invention uses as the dispersing and level-dyeing agent a mixture of oleic acid, polyethylene glycol, stearic acid, polyoxyalkylene tristyrenated phenol and a block copolymer of polyoxyethylene-polyoxypropylene in the amount of 0.5-1.0% by weight, in order to improve the chromaticness of the ink color. Specifically, this is to prevent a situation where uniform color and chromaticness cannot be expressed by uneven distribution of ink due to surface tension in writing on a smooth surface such as white board. It is to overcome the problem of the prior art wherein the chroma of colors deteriorated as time went by As the fixing agent, the present invention uses hydroxypropyl cellulose (HPC) solution to improve the stability of image regardless of friction in writing. This is to enhance the stability of written notes by forming a thin polymeric film on the surface after writing.

However, the fixing agent may deteriorate the fading-away effect of ink by blocking contact with moisture due to the film formed on the surface after drying for a long time, and as a result the remaining fixing agent and the coloring agent affixed thereto may cause yellowing phenomenon.

Therefore, in order to prevent this and to prevent the formation of an afterimage due to the residuum that left after erasing the written notes, the present invention uses the surfactant to improve the hydrophilic property.

It is particularly preferable to use the surfactant in the range of HLB 14 to HLB 16. If a surfactant with HLB higher than 16 is used, as the solubility in water becomes too high, the ink can be erased so easily and the stability of image may deteriorate. Therefore, it is preferable to use 2-4% by weight of polyoxyethylene lauryl ether as the surfactant.

Finally, the composition of the present invention comprises more than one aliphatic alcohol solvent selected from a group comprising n-butyl alcohol, n-propyl alcohol, isopropyl alcohol and pentanol, to obtain the effect of coupling retardation. It is particularly preferable to use n-butyl alcohol since it shows an appropriate effect of coupling retardation. That is, it takes about 15 seconds for the ink containing n-butyl alcohol to develop, which is appropriate to provoke the curiosity of students or to obtain the ornamental effect.

If a shorter retardation of coupling is desired, isopropyl alcohol or n-propyl alcohol may be used, and if a longer retardation is desired, pentanol may be used.

The components and the composition ratios as described above are those which have been found optimistic by the inventor of the present invention as a result of experiments.

The ink using the water-removable composition of the present invention may be applied on any material such as paper, film, glass, plastic, etc. and is removable. For a complete removal of the ink, it is preferable that the ink is applied on a smooth surface. It is preferable to avoid a material, surface of which can be dissolved by a solvent, e.g., ABS resin.

DETAILED DESCRIPTION OF THE PREFERRED EMBODIMENTS

The principal of the present invention will be described in more detail below with reference to the embodiments, but the scope of the invention is not limited within the embodiments.

Embodiment 1

Solution A was made by dissolving a coloring agent, i.e., 3 g of 2-dibenzylamino-6-diethylaminofluoran into 40 g of methylethylketone at the normal room temperature for 30 minutes. Solution B was made by adding 7 g of gallic acid (3,4,5-oxybenzoic acid) as a developer to 30 g of n-butyl alcohol. Solution B was slowly input to Solution A, and they were stirred for 10 minutes. Then, 0.8 g of triglyceride was added as a lubricant and stirred. Then, 3 g of polyoxyethylene lauryl ether as a surfactant was added to the solution obtained above and stirred for 10 minutes, and then 5 g of 5% n-butyl alcohol solution of hydroxypropyl cellulose (HPC) was added as a fixing agent and stirred to be dissolved at the normal room temperature for 1 hour. Then, 0.5 g of a mixture of oleic acid, polyethylene glycol, stearic acid, polyoxyalkylene tristyrenated phenol and a block copolymer of polyoxyethylene-polyoxypropylene was added as a dispersing and level-dyeing agent. After standing for 12 hours, a supernatant solution was taken for use as ink in a writing instrument.

Embodiment 2

Instead of n-butyl alcohol, which was used as a solvent for dissolving the gallic acid in the above embodiment 1, n-propyl alcohol, isopropyl alcohol and pentanol of the same amount were respectively used to produce three kinds of ink solutions.

Comparative Embodiment

As described in Japanese Patent Publication No. 1997-59547, a mixture of 5 g of 3-diethylamino-7-chlorofluoran, 5 g of calcium chloride, 10 g of polyethylene glycol ether, and 80 g of ethyl alcohol was heated for 3 minutes to produce water-removable ink.

[Test for residual contaminants] 3 ml of the ink obtained in the above embodiment 1 and of the ink obtained in the above comparative embodiment were respectively input in a filter for a white board pen and the filter stood for 30 minutes so that the ink could permeate through the wick of the pen. A cotton eraser of the size 5 cm×3 cm was prepared. On a white board, writings of 10 cm length were simultaneously written at the same velocity, and they were erased with different amounts of water. Then, residual contaminants were observed. Further, the writings which had been erased were dried at 40 and yellowing phenomenon was observed.

The results are described in the following tables 1 and 2.

TABLE 1

| Amount of water used | | 2 ml | 4 ml | 6 ml | 8 ml |
|---|---|---|---|---|---|
| Residual contaminants | Embodiment 1 | Infinitesimal | None | None | None |
| | Comp. Embodiment | Abundant | Small | Very small | Very small |

TABLE 2

| Amount of water used | | 2 ml | 4 ml | 6 ml | 8 ml |
|---|---|---|---|---|---|
| Yellowing phenomenon | Embodiment 1 | Minute | No Yellowing | No Minute | No Minute |
| | Comp. Embodiment | Yellowing | Yellowing | Minute | Minute |

[Test for the effect of coupling retardation] 3 ml of the ink obtained in each of the above embodiments 1 and 2 was input in a filter for writing and a time for coupling was measured. The result is in the following table 3.

TABLE 3

| | Sovent | | | |
|---|---|---|---|---|
| | isopropyl alcohol | n-propyl alcohol | n-butyl alcohol | pentanol |
| Time for coupling | 3 seconds | 9 seconds | 15 seconds | 38 seconds |

The compositions for water-removable ink obtained as above according to the present invention did not leave residuum after being erased, but faded away rapidly. Also, the yellowing phenomenon was little observed. Furthermore, by selecting a suitable aliphatic solvent, it was possible to adjust the retardation of coupling the ink.

As described above, disadvantages encountered in the conventional ink, i.e., occurrence of yellowing phenomenon, deterioration of the fluidity of ink, incomplete fading-away property can considerably be overcome by the composition for water-removable ink according to the present invention.

Further, according to the present invention, the composition for water-removable ink shows an effect of coupling retardation, which has long been expected but has not yet been fulfilled, contributing to the stimulation of curiosity of infants or juveniles and enhancing the learning effect remarkably.

Therefore, the present invention solves the problems encountered in the prior art by providing a new composition for water-removable ink.

It will be apparent to those skilled in the art that various modifications and variations can be made to the present invention without departing from the spirit and scope of the invention. The present invention covers the modifications and variations thereof provided they come within the scope of the appended claims and their equivalents.

What is claimed is:

1. Composition for water-removable ink comprising:
   3-5% by weight of more than one electron-donating coloring agent selected from a group consisting of 2-anilino-6-dibutylamino-3-methylfluoran, 2-dibenzylamino-6-diethylamino fluoran and 9-(diethylamino) spiro[12H-benzo[a]xanthene-1,2-isobenzofuran]-3;
   6-8% by weight of gallic acid (3,4,5-oxybenzoic acid) as an electron-accepting developer;
   40-45% by weight of methylethylketone as a hydrophilic solvent;
   0.5-1.0% by weight of triglyceride as a lubricant;
   2-4% by weight of polyoxyethylene lauryl ether as a surfactant;
   0.5-1.0% by weight of a mixture of oleic acid, polyethylene glycol, stearic acid, polyoxyalkylene tristyrenated phenol and a block copolymer of polyoxyethylene-polyoxypropylene as a dispersing and level-dyeing agent;
   5-7% by weight of 5% hydroxypropyl cellulose solution as a fixing agent; and
   the balance of more than one solvent selected from a group consisting of n-butyl alcohol, n-propyl alcohol, isopropyl alcohol and pentanol.

2. The composition as claimed in claim 1, wherein the balance of the solvent is n-butyl alcohol.

* * * * *